United States Patent [19]
Jirnov et al.

[11] Patent Number: 5,558,509
[45] Date of Patent: Sep. 24, 1996

[54] SLIDING-BLADE WATER JET PROPULSION APPARATUS FOR WATERCRAFT

[76] Inventors: Olga Jirnov; Alexei Jirnov, both of 5490 Braesvalley, Apt. 420, Houston, Tex. 77096

[21] Appl. No.: 418,596

[22] Filed: Apr. 6, 1995

Related U.S. Application Data

[63] Continuation-in-part of Ser. No. 400,764, Mar. 8, 1995, Pat. No. 5,511,525.

[51] Int. Cl.$^6$ ............................ F01C 1/344; B63H 11/08; B63H 11/10
[52] U.S. Cl. ............................ 418/15; 418/150; 418/235; 418/255; 418/264; 60/221; 417/348; 440/38; 440/44
[58] Field of Search .............................. 417/348; 418/15, 418/150, 254, 255, 264, 235; 440/38, 44, 45; 60/221, 222

[56] References Cited

U.S. PATENT DOCUMENTS

| | | | |
|---|---|---|---|
| 787,988 | 4/1905 | Moore | 418/235 |
| 830,334 | 9/1906 | Kummerow | 418/255 |
| 1,296,356 | 3/1919 | Bey | 417/348 |
| 3,163,980 | 1/1965 | Turner | 440/44 |
| 3,183,878 | 5/1965 | Aschauer | 440/38 |
| 3,499,600 | 3/1970 | McGregor | 418/150 |
| 4,775,341 | 10/1988 | Tyler et al. | 440/38 |
| 5,144,802 | 9/1992 | Ruzic | 418/255 |

FOREIGN PATENT DOCUMENTS

| | | | |
|---|---|---|---|
| 531659 | 10/1921 | France | 418/255 |

*Primary Examiner*—John J. Vrablik
*Attorney, Agent, or Firm*—Kenneth A. Roddy

[57] ABSTRACT

A sliding-blade water jet propulsion apparatus has an oval-shaped chamber and a water channel extending generally tangential to the chamber with a cylindrical rotor rotatably mounted eccentrically in the chamber. The rotor has at least two rectangular blades slidably mounted in slots extending through the cylindrical rotor in mutually perpendicular relation and each blade is independently movable relative to the other in a radial direction. Each blade has a guide element extending from opposed sides and through the opposed end walls of the rotor which are slidably received in guide grooves in the chamber end walls. The guide elements traveling in the guide grooves cause the blades to extend and retract radially with their outer ends following the inner periphery of the chamber side wall and a portion of the water channel with a constant clearance. In one embodiment, the rotor is rotated by a working gas entering the chamber and upon expansion effectuating gas pressure on one side of the blades which causes water in the water channel to be expelled by the opposite side of the blade without substantial mixing of the gas with the water, and as the rotor rotates more water is drawn into the water channel. In another embodiment, the rotor is rotated by an external power source connected to the shaft of the rotor rather than by a working gas.

9 Claims, 6 Drawing Sheets

WORKING GAS

SLIDING-BLADE WATER JET PROPULSION APPARATUS FOR WATERCRAFT

CROSS REFERENCE TO RELATED APPLICATION

This application is a continuation-in-part of U.S. patent application Ser. No. 08/400,764, U.S. Pat. No. 5,511,525.

BACKGROUND OF THE INVENTION

1. Field of the Invention

This invention relates generally to water jet pumps and propulsion units, and more particularly to a sliding-blade water jet propulsion apparatus suitable for use as a propulsion unit for jet propulsion watercraft.

2. Brief Description of the Prior Art

Various watercraft propulsion apparatus are known in the art. Modern screw propellers are highly efficient thruster units, however, the problem of cavitation limit their potential to increase the speed of the watercraft.

Water jet propulsion units utilizing pumps and external drives are also known in the art which, in principle, can accomplish fast travel on water. However, most of these types of propulsion assemblies are relatively complicated designs, have large overall dimensions, and have large energy losses associated with the conversion of fuel combustion energy into kinetic energy associated with the movement of the watercraft. There are several patents which disclose water jet propulsion units utilizing pumps and external drives.

Henmi, U.S. Pat. No. 5,277,631 discloses a vane arrangement for a water jet propulsion assembly.

Schulze, U.S. Pat. No. 5,366,396 discloses a water-jet drive with a stator and a rotor enclosed by a housing having an inlet and an outlet nozzle and has a torque transmitting means at one end of the rotor supporting shaft.

Gerard et al, U.S. Pat. No. 5,045,002 discloses a jet propulsion assembly for ships which includes an axial or semi-axial propeller type pump.

Cernier, U.S. Pat. No. 5,265,549 discloses a hydro-propelled ship with a pair of propulsion turbines affixed to a starboard side and a port side of the hull.

Propulsion apparatus wherein the gas expansion process is combined with the jet stream generation in the same operating chamber are also known in the art. The optimal value for velocity is equal to twice the watercraft cruising speed. An increase in propulsion efficiency can be accomplished by creating a jet stream of large mass with relatively low velocity. A classical single-circuit ramjet for watercraft has low propulsion efficiency because the ratio of it's cruise speed and the velocity of jet propulsion is far from the optimal value.

Krautkremer et al, U.S. Pat. No. 4,411,630 discloses a water jet drive mechanism for driving a watercraft which includes an elbow located in the hull which contains a pump by which water is sucked in through a suction passage and is ejected downwardly through an ejector passage. A gas is supplied to the water jet at the ejector passage.

The ejection and mixing type of propulsion units wherein the gas expansion process is combined with the jet stream generation have large hydrodynamic and thermal losses due to the enthalpy of converting the working gas into a high velocity head and mixing of the gas with water in the expansion process.

Pulsating hydro-jet engines wherein the gas expansion work is transmitted to the added mass of water by the use of a flat hydrodynamic piston which separates the gas expansion work from the jet stream generation overcome some of the problems of the ejection and mixing type units.

Jastram et al, U.S. Pat. No. 3,951,094 discloses a gas driven, pulsating water jet propulsive duct drive for watercraft which has a water inlet aperture at the front end with a closure member which opens and closes periodically and a gas power outlet behind the inlet aperture. The forward inlet of the water filled duct is periodically closed and the power gas power outlet opened to feed gas under pressure into the duct and expel the fluid.

Jarry, U.S. Pat. No. 3,872,665 discloses an underwater pulse jet motor comprising a stator and a rotor within the stator which has axially extending ducts at it's periphery. The stator includes a closing segment which closes off the forward ends of the ducts as they pass it during rotation of the rotor. Gas under pressure is injected into the ducts through a passage in the stator in alignment with the closing segment.

In reality, hydrodynamic and thermal losses will develop in the pulsating hydro-jet devices because the steep wave front caused by pulsation of the working medium will be broken and mixing of both masses will occur when the masses are interacting. It is also well known that pulsating propulsion has significant disadvantages compared to continuous flow propulsion.

The present invention overcomes these problems and limitations of the prior art.

SUMMARY OF THE INVENTION

It is therefore an object of the present invention to provide a sliding-blade water jet propulsion apparatus which is small and light and can generate a large amount of power.

It is another object of this invention to provide a gas powered sliding-blade water jet propulsion apparatus that has improved fuel and propulsion efficiency at different cruise speeds.

Another object of this invention is to provide a gas powered sliding-blade water jet propulsion apparatus which does not cool the working gas and thus does not affect the expansion work of the working gas.

A further object of this invention is to provide a gas powered sliding-blade water jet propulsion apparatus wherein the processes of gas expansion and water jet generation are combined in the same operating chamber without mixing of the gas and water during expansion.

A still further object of this invention is to provide a sliding-blade water jet propulsion apparatus which is inexpensive to manufacture in mass production and is inexpensive to operate, service, and repair.

Other objects of the invention will become apparent from time to time throughout the specification and claims as hereinafter related.

The above noted objects and other objects of the invention are accomplished by a sliding-blade water jet propulsion apparatus which has an oval-shaped chamber and a water channel extending generally tangential to the chamber with a cylindrical rotor rotatably mounted eccentrically in the chamber. The rotor has at least two rectangular blades slidably mounted in slots extending through the cylindrical rotor in mutually perpendicular relation and each blade is independently movable relative to the other in a radial direction. Each blade has a guide element extending from opposed sides and through the opposed end walls of the rotor which are slidably received in guide grooves in the chamber end walls. The guide elements traveling in the guide grooves cause the blades to extend and retract radially with their outer ends following the inner periphery of the chamber side wall and a portion of the water channel with a constant clearance. In one embodiment, the rotor is rotated by a working gas entering the chamber and upon expansion effectuating gas pressure on one side of the blades which causes water in the water channel to be expelled by the opposite side of the blade without substantial mixing of the gas with the water, and as the rotor rotates more water is drawn into the water channel. In another embodiment, the rotor is rotated by an external power source connected to the shaft of the rotor rather than by a working gas.

BRIEF DESCRIPTION OF THE DRAWINGS

FIG. 2 is a vertical cross section through the expansion chamber of the sliding-blade water jet propulsion apparatus taken along line 2—2 of FIG. 1.

FIG. 3 is a partial elevation of one of the guide grooves formed in the end walls of the expansion chamber of the sliding-blade water jet propulsion apparatus.

DESCRIPTION OF THE PREFERRED EMBODIMENTS

Figure 1:
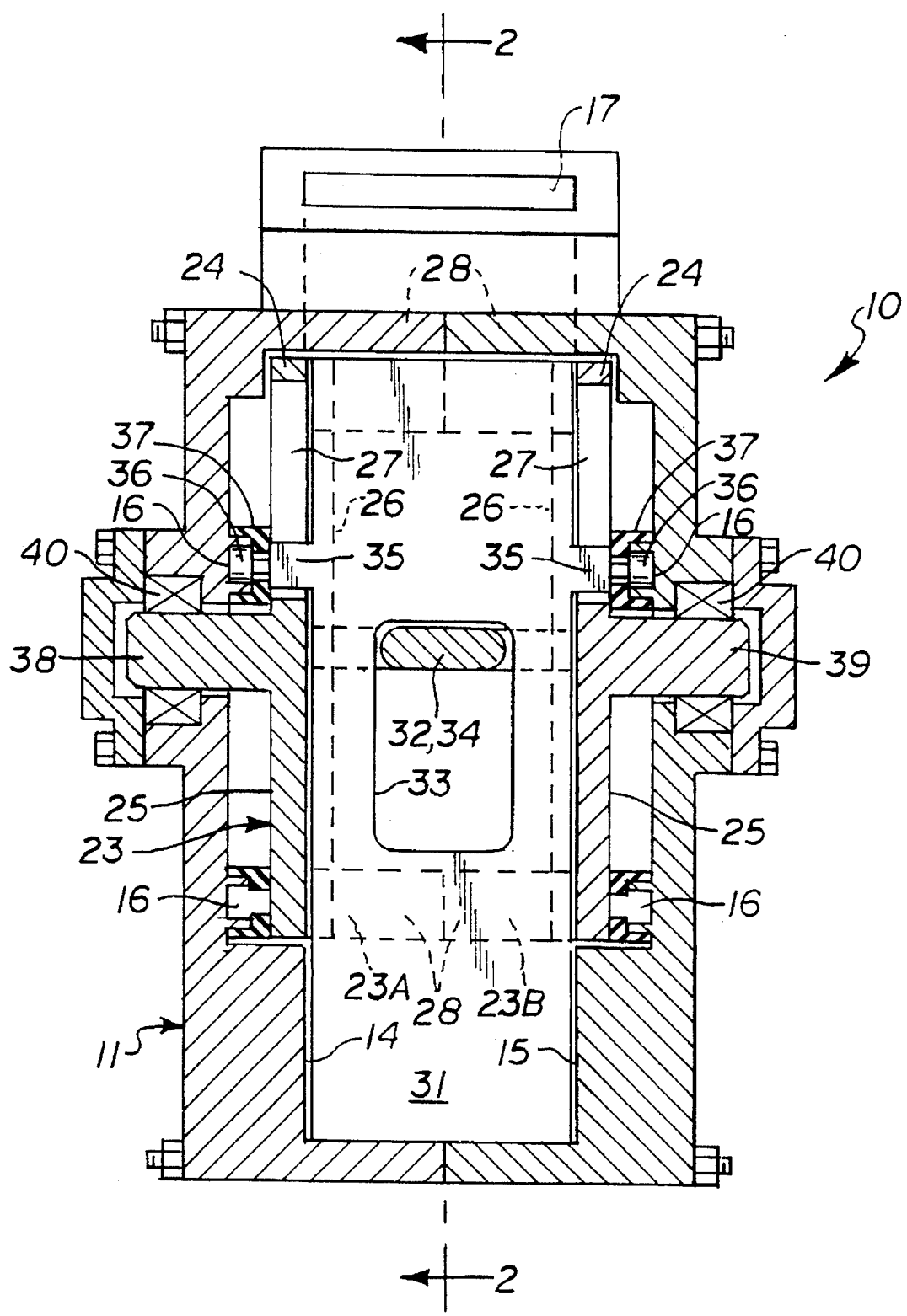
FIG. 1 is a vertical cross section of a preferred gas powered embodiment of the sliding-blade water jet propulsion apparatus in accordance with the present invention.
Figures 2, 3:
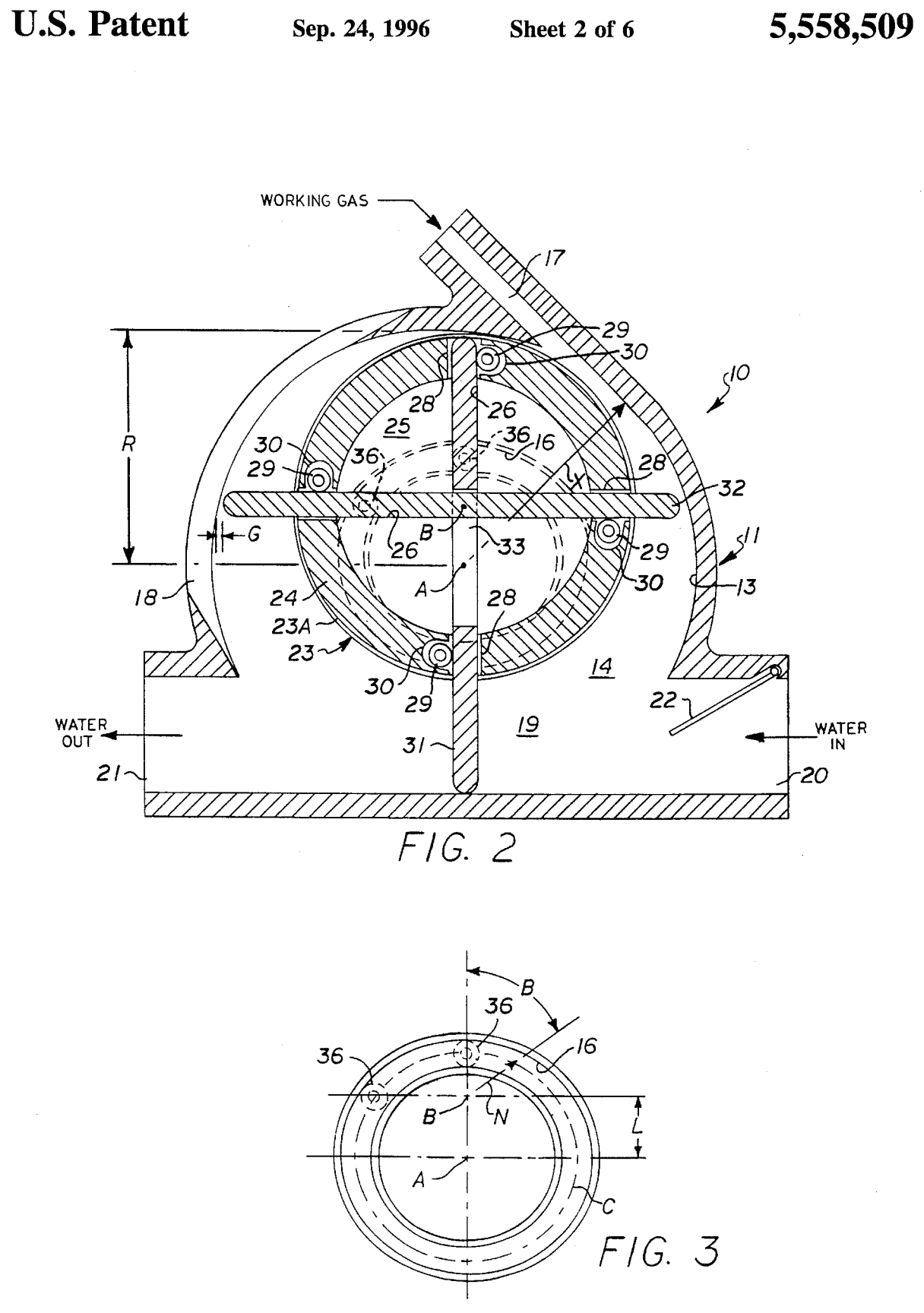

Referring to the drawings by numerals of reference, a gas powered embodiment of the sliding-blade water jet propulsion apparatus 10 in accordance with the present invention is shown in vertical cross section in FIGS. 1 and 2. The propulsion apparatus 10 has an oval-shaped expansion chamber 11 defined by an oval shaped cavity having a contoured oval-shaped side wall 13 and opposed facing flat end walls 14 and 15, respectively.

As best seen in FIG. 3, continuous guide grooves 16 are formed in the opposed interior surfaces of the flat end walls 14 and 15 of the expansion chamber 11. The interior and exterior peripheral surfaces of the guide grooves 16 are raised above the flat surface.

As best seen in FIG. 2, the expansion chamber 11 has a working gas inlet port 17 through its side wall 13 positioned at an angle to allow entry of the working gas into the chamber tangential to the plane of rotation and a relatively large working gas outlet port 18 which extends circumferentially along its side wall 13 and allows the working gas to exit tangential to the plane of rotation. The width of the working gas inlet port 17 and outlet port 18 are approximately the same width as the expansion chamber 11 to provide maximum filling of the volume of the chamber and minimize hydrodynamic loss.

A water channel 19 extends through the lower portion of the expansion chamber 11 generally tangential to the chamber and has a water inlet 20 and a water outlet 21 at opposite ends to allow entry and discharge of water in the direction of rotor rotation. The width of the water channel 19 and water inlet and outlet 20 and 21 are approximately the same width as the expansion chamber 11 to provide maximum filling of the channel and minimize hydrodynamic loss.

The water inlet 20 is provided with a damper 22 which regulates the amount of water allowed to pass through the water channel 19. The damper 22 may be adjusted to govern the water jet output to provide optimal relation between cruise speed and jet velocity and insure maximal propulsion efficiency, as described below.

Figure 4:
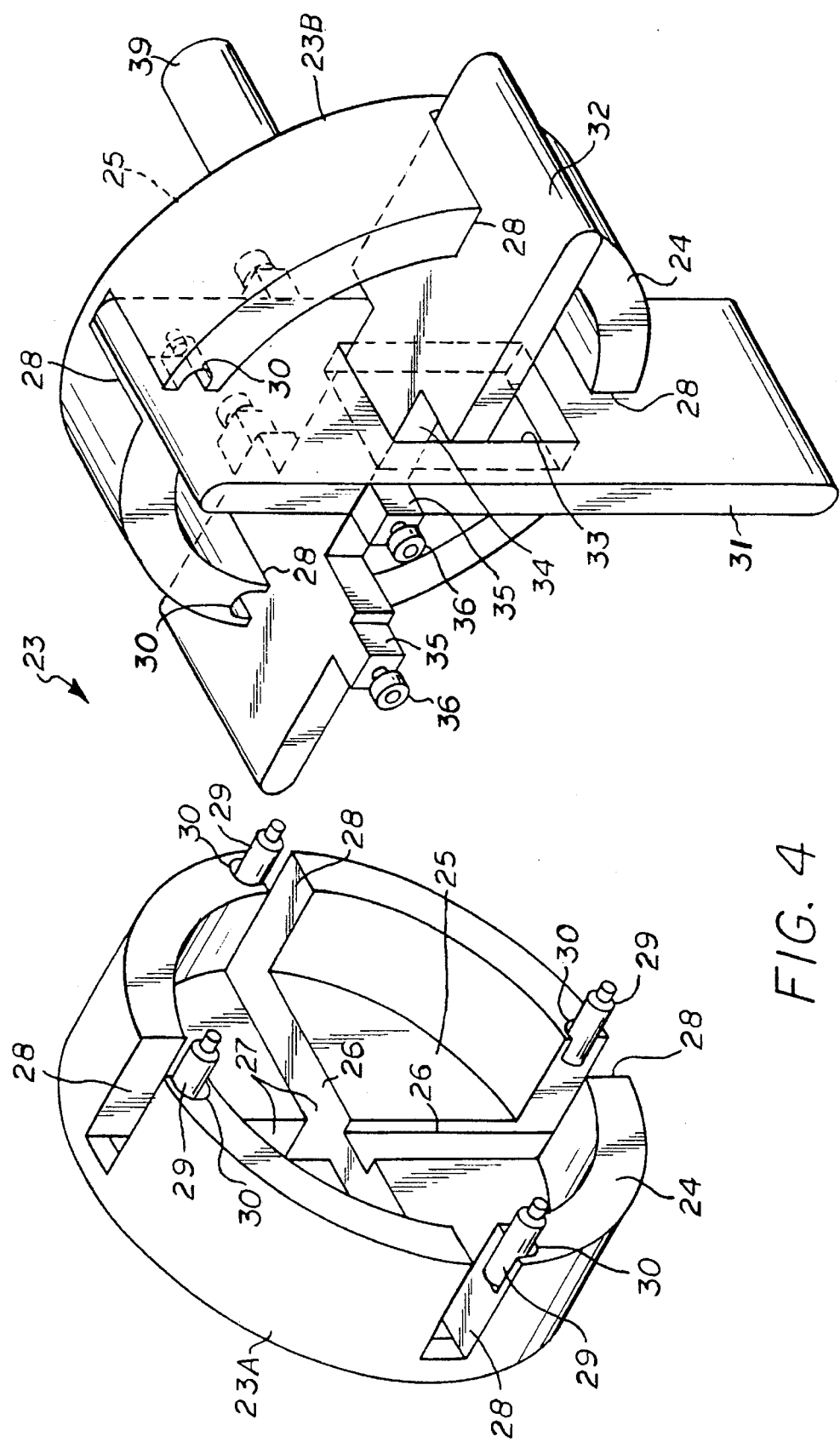
FIG. 4 is an exploded isometric view of the rotor of the sliding-blade water jet propulsion apparatus shown in an unassembled condition.
Figure 5:
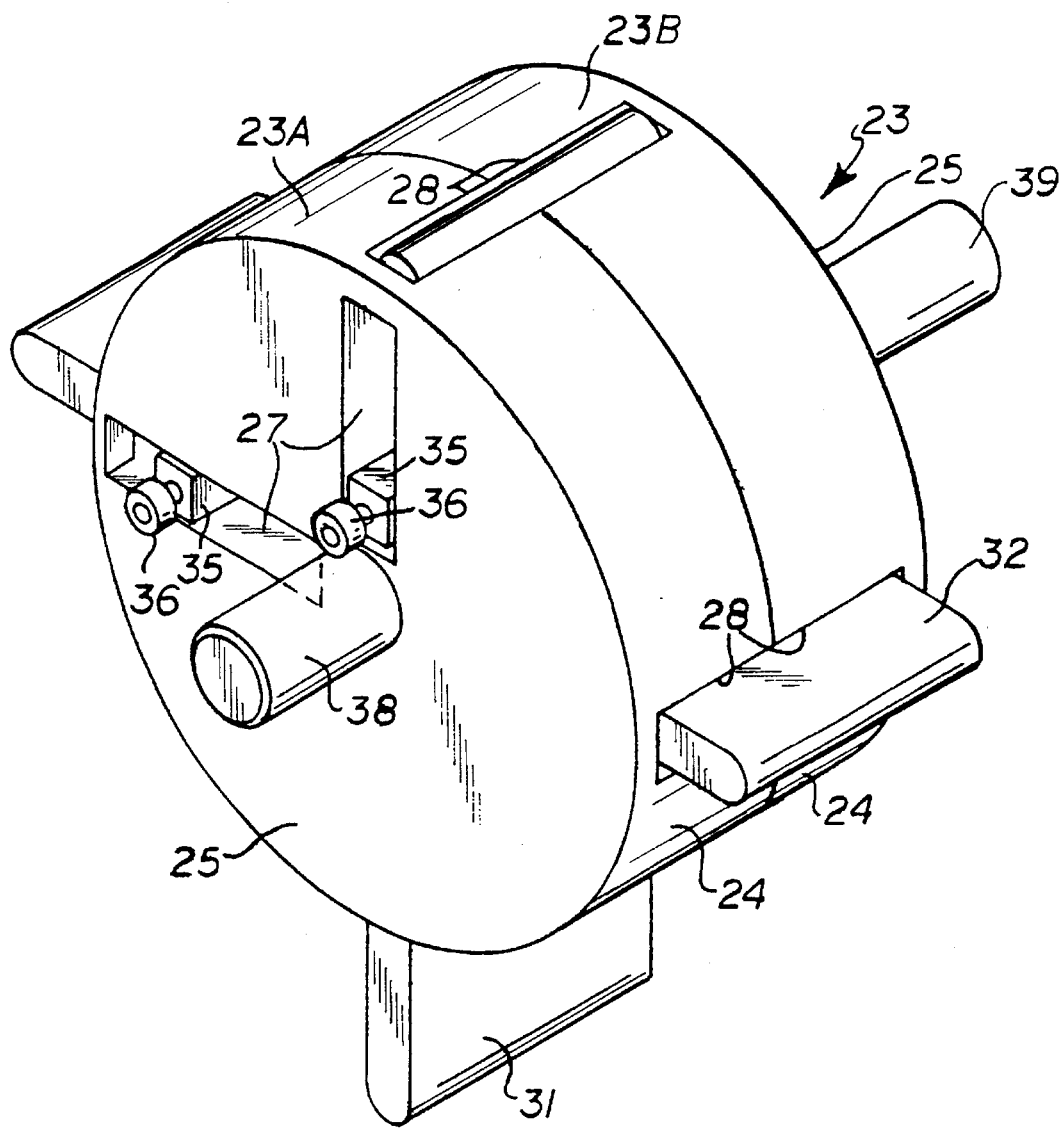
FIG. 5 is an isometric view of the rotor of the sliding-blade water jet propulsion apparatus shown in an assembled condition.

A sliding blade rotor 23 is rotatably disposed in the expansion chamber 11. As best seen in FIGS. 4 and 5, the rotor 23 is formed by a pair of opposed hollow cylindrical members 23A and 23B, each having a circular side wall 24 and an end wall 25. A pair of perpendicular elongate rectangular slots 26 are formed in the interior surface of the end walls 25 of the cylindrical members 23A and 23B and extend through the center of rotation of the cylindrical members. A portion of the slots 26 on one side of the center of rotation extend all the way through the flat end walls 25 of the cylindrical members 23A and 23B to form a pair of rectangular perpendicular slots 27 through the outer surface of the flat end walls 25, as best seen in FIG. 5.

A series of circumferentially spaced rectangular slots 28 extend through the circular side walls 24 of the circular members 23A and 23B from their open end and terminate at the flat end walls 25 in axial alignment with the slots 26 in the flat end walls.

Rollers 29 are mounted in recesses 30 in the side walls 24 of the cylindrical members 23A and 23B closely adjacent each slot 28 with their curved exterior surface protruding a short distance into the slot opening (FIGS. 2, and 4).

A pair of perpendicular elongate rectangular rigid blades 31 and 32 are slidably received in the elongate slots 26. One blade 31 of the pair is provided with a central rectangular opening 33 and the other blade 32 of the pair is provided with a central narrow rectangular portion 34 which is received through the opening 33 such that the perpendicular blades 31 and 32 can slide independently relative to one another. A foot lug 35 extends outwardly a short distance from the opposed side edges of each blade 31 and 32 in opposed relation, and a roller 36 is rotatably mounted at the outer end of each lug.

As shown in FIG. 5, the circular members 23A and 23B are secured together in opposed relation over the blades 31 and 32 to form a circular drum configuration. The outer ends of the blades 31 and 32 extend slidably through the slots 28 in the circular side walls 24 and are supported on opposed sides by the rollers 29 as seen in FIGS. 2 and 4. In the assembled condition, the lugs 35 and rollers 36 extend through the slots 27 in the flat end walls 25 and the rollers 36 are received and travel in the continuous guide grooves 16 in the opposed interior surfaces of the flat end walls 14 and 15 of the expansion chamber 11, as seen in FIG. 1. An elastomeric seal collar 37 is installed on the raised interior and exterior peripheral surfaces of the guide grooves 16 and forms a fluid sealing relation against the exterior surfaces of the end walls 25 of the cylindrical members 23A and 23B.

As best seen in FIG. 1, a shaft 38 secured to the exterior of the flat end wall 25 of one of the rotor cylindrical members 23A extends outwardly from its center through a hole in the flat end wall 14 of the expansion chamber 11 and a coaxial opposed shaft 39 secured to the exterior of the opposed flat end wall 25 of the opposed cylindrical member 23B extends outwardly from its center through a hole in the opposed flat end wall 15 of the expansion chamber 11. The shafts 38 and 39 are journalled in the expansion chamber by bearings 40.

The centerline "B" of the shafts 38 and 39 and rotor 23 is eccentrically offset from the center of the oval-shaped expansion chamber 11.

When the rotor 23 turns, the blades 31 and 32 reciprocate radially resting on the rollers 29 mounted in the side walls 24 of the cylindrical members 23A and 23B to form four vane blades of variable length in the expansion chamber and function as pistons during the expansion of the working gas. The radial travel of the blades 31 and 32 is regulated by the guide grooves 16 in which the rollers 36 at the ends of the lugs 35 of each blade travel.

Referring now to FIGS. 2 and 3, the centerline "B" of the shafts 38 and 39 and rotor 23 is eccentrically offset from the center of the oval-shaped expansion chamber 11 by a distance L. The sliding blades 31 and 32 of the rotor 23 are of a predetermined length to provide a clearance gap "G" between the outer tip ends of the blades and the interior surface of the oval side wall 13 of the expansion chamber 11 and water channel 19.

In the preferred embodiment, the centerline "C" of the guide grooves 16 in the rotation plane of the rotor 23 is defined by the equation:

$$N = H + L (1 - \cos \beta)$$

Where
N=distance from the center of rotor rotation (point B) to the centerline C of the groove,
H=constant design value,
L=eccentricity, and
β=rotor swing angle from the contiguity point of the outer surface of the cylindrical drum and the inner surface of the chamber side wall 13.

The inner surface of the expansion chamber side wall 13 in the rotation plane of the rotor is calculated and configured according to the equation:

$$X = \sqrt{R^2 + (L \times \sin \beta)^2}$$

Where
X=a variable distance between the inner surface of the chamber side wall 13 in a plane extending through the center of symmetry (point A) of the oval surface,
R=one-half of the shorter axis of the oval,
L=eccentricity, and
β=rotor swing angle from the contiguity point of the outer cylindrical surface of the drum and the inner surface of the chamber side wall 13.

Referring again to FIG. 2, the working gas enters the expansion chamber 11 through gas inlet 17 and expands as it travels around the increasing volume or space and causes rotation of the rotor 23. As the blades 31 and 32 pass through the water channel 19 the blades act as pistons and suck water into the water channel through the water inlet 20 and as rotation continues, the blades discharge the water through the water outlet 21 and the working gas is exhausted from expansion chamber 11 through the large exhaust port 18.

Thus, one side of the blades 31 and 32 receive gas pressure and the other side of the blades propel the water in the manner of a piston, and generate a water jet without substantially mixing the gas with the water during expansion. The gas and water are divided or stratified by centrifugal force. This feature also does not allow the water to cool the working gas and allows efficient gas expansion at elevated temperatures which provides high thermodynamic efficiency.

The damper 22 is used to vary the area of the water inlet 20 and the water entry angle in relation to the speed of the watercraft. During low speed operation, the damper 22 is adjusted to a maximum angle to allow sufficient water to enter the water channel 19 and permit efficient rotor operation. As the watercraft speed increases, the water inlet area or angle is reduced to prevent excess water from entering the channel.

Figure 6:
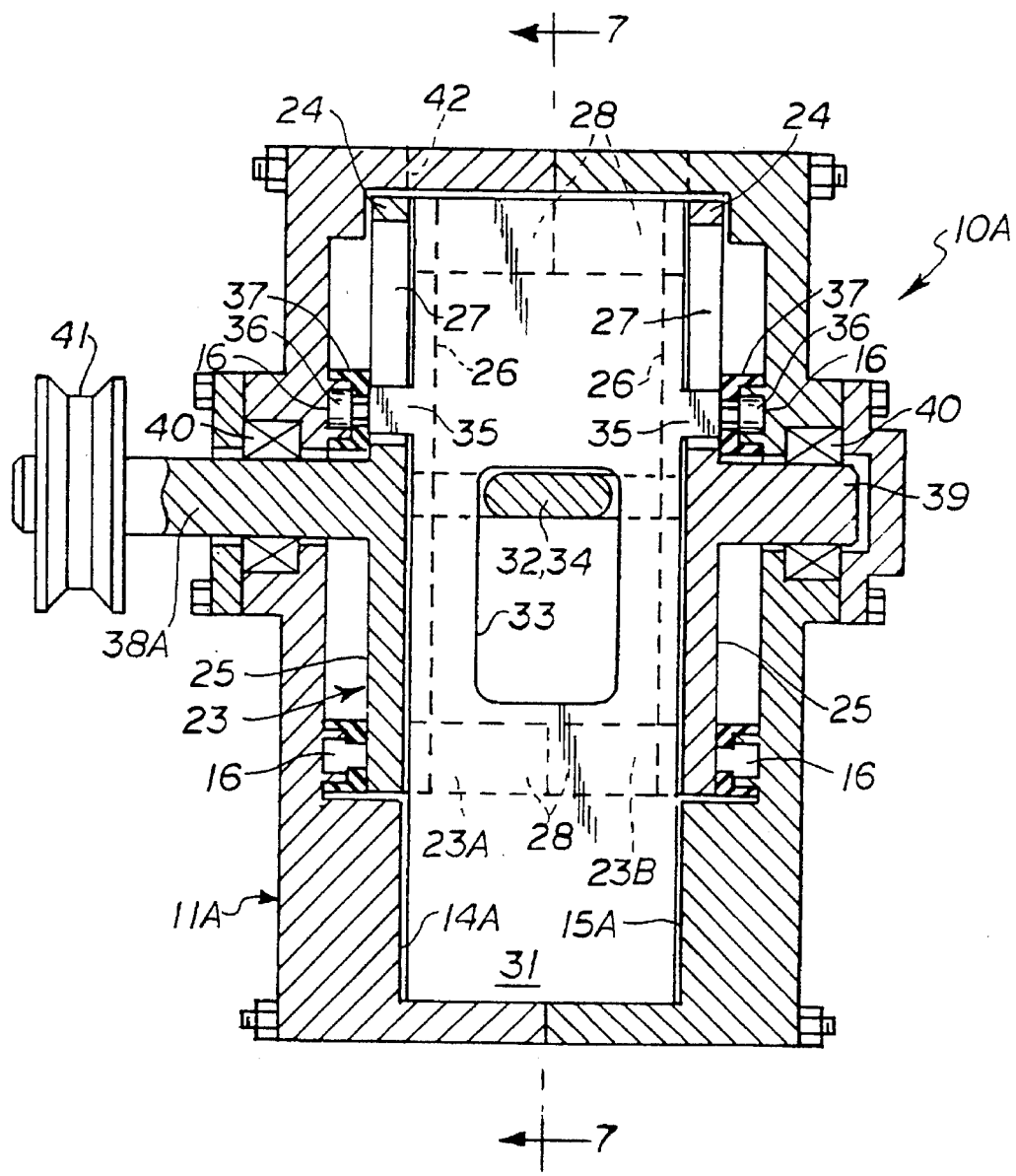
FIG. 6 is a vertical cross section through the chamber of a preferred externally powered embodiment of the sliding-blade water jet propulsion apparatus in accordance with the present invention.
Figure 7:
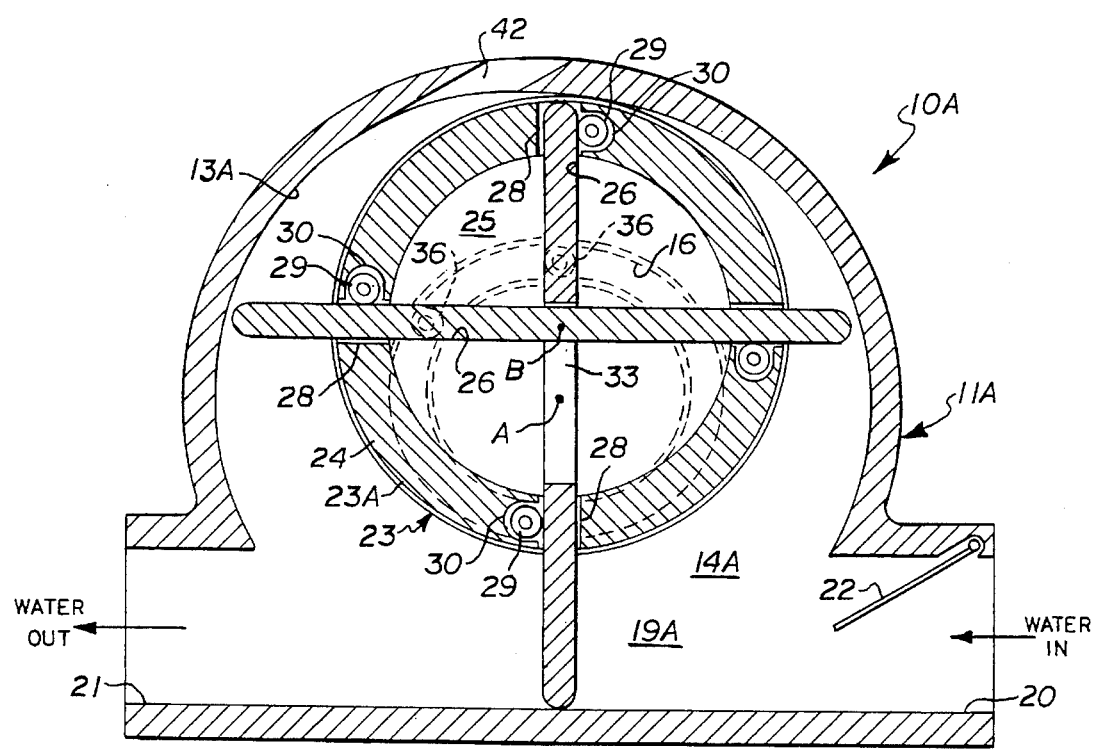
FIG. 7 is a vertical cross section through the expansion chamber of the sliding-blade water jet propulsion apparatus taken along line 7—7 of FIG. 6.

Referring now to FIGS. 6 and 7 of the drawings, there is shown a modification of the water jet propulsion apparatus 10A which powered by an external power source. In the embodiment of FIGS. 6 and 7, the working gas inlet is closed off or eliminated and the rotor is rotated by an external power source connected to the shaft of the rotor rather than by a working gas.

In the following description, only the components which are modified are described in detail. The rotor and other components which are not modified are the same as previously described are given the same reference numerals. However, the detailed description of the unmodified components will not be repeated to avoid repetition.

The externally powered embodiment 10A has an oval-shaped chamber 11A defined by an oval shaped cavity having a contoured oval-shaped side wall 13A and opposed facing flat end walls 14A and 15A, respectively. As best seen in FIG. 7, the oval-shaped chamber 11A has drainage port 42 through its side wall 13A positioned at an angle to allow drain tangential to the plane of rotation. The width of drainage port 42 is approximately the same width as the oval-shaped chamber 11A.

As previously described, continuous guide grooves 16 are formed in the opposed interior surfaces of the flat end walls 14A and 15A of the chamber 11A. The interior and exterior peripheral surfaces of the guide grooves 16 are raised above the flat surface and are provided with the seal collar 37 as described above.

A water channel 19A extends through the lower portion of the chamber 11A and has a water inlet 20 and a water outlet 21 at opposite ends to allow entry and discharge of water in the direction of rotor rotation. The width of the water channel 19A and water inlet and outlet 20 and 21 are approximately the same width as the chamber 11A to provide maximum filling of the channel and minimize hydrodynamic loss, and the water inlet 20 is provided with a damper 22, as previously described.

A sliding blade rotor 23, as previously described and shown in detail in FIGS. 4 and 5 is rotatably disposed in the chamber 11A. In the water jet thruster modification, one of the shafts 38A secured to the exterior of the flat end wall 25 of one of the rotor cylindrical members 23A extends outwardly from its center through a hole in the flat end wall 14A of the chamber 11A and a drive pulley 40 is secured to its outer end. The drive pulley 40 is rotated by a power source, such as a motor and belt drive (not shown) exterior of the chamber 11A which rotates the rotor 23.

As previously described, when the rotor 23 turns, the blades 31 and 32 reciprocate radially resting on the rollers 29 mounted in the side walls 24 of the cylindrical members 23A and 23B to form four vane blades of variable length in the chamber. As the blades 31 and 32 pass through the water channel 19A they act as pistons and suck water into the water channel through the water inlet 20 and as rotation continues, the blades discharge the water through the water outlet 21, and through the drainage port 42.

It should be understood, that although the rotor has been shown and described with a pair of blade members, the rotors may utilize any number of blades.

While this invention has been described fully and completely with special emphasis upon preferred embodiments, it should be understood that within the scope of the appended claims the invention may be practiced otherwise than as specifically described herein.

We claim:

1. A sliding-blade water jet propulsion apparatus for watercraft comprising:

an oval-shaped chamber having a peripheral side wall which is oval-shaped in cross section, parallel opposed facing flat end walls, and a continuous guide groove formed in each said end wall;

the inner periphery of said oval-shaped side wall of said chamber in the plane of rotor rotation is configured according to the equation:

$$X = \sqrt{R^2 + (L \times \sin \beta)^2}$$

where

X=a variable distance between the inner periphery of said chamber in a plane extending through the center of symmetry of said oval-shaped side wall, R=one-half of the minor axis of the oval, L=eccentricity of the center of rotor rotation relative to the central axis of said chamber, and β=rotor swing angle from the contiguity point of the circular surface of said rotor and the inner surface of said oval-shaped chamber side wall;

a water channel extending through said chamber generally tangential thereto and having a water inlet and a water outlet;

a cylindrical rotor having a circular side wall, parallel opposed flat end walls, at least two mutually perpendicular slots extending radially through said rotor with a radial extending portion of each said slot extending through said rotor end walls, a concentric shaft extending outwardly from each said end wall, said rotor rotatably mounted by said shafts eccentrically in said chamber relative to the major axis of said chamber;

at least two elongate rectangular blades slidably mounted one in each of said slots extending through said rotor in mutually perpendicular relation, each independently movable relative to the other in a radial direction and each said blade having a guide element extending from opposed sides and through said radial extending portion of each said slot outwardly from said rotor end walls which are slidably received in said guide groove in said chamber end walls; and means for rotating said rotor to cause said blades to draw water through said water inlet into said water channel generally tangential to the axis of rotation and discharge said water through said water outlet in a jet stream;

upon rotation of said rotor, said guide elements traveling in said guide grooves causing said blades to extend and retract radially with their outer ends following the inner periphery of said oval-shaped side wall of said chamber and the inner periphery of a portion of said water channel with a constant clearance between the outer tip ends of said blades and said inner peripheries.

2. The apparatus according to claim 1 wherein said continuous guide grooves have a centerline in the plane of rotation defined by the equation:

$$N = H + L(1 - \cos \beta)$$

where

N=distance from the center of rotor rotation to the centerline of said grooves,

H=constant design value,

L=eccentricity of the center of rotor rotation relative to the central axis of said chamber, β=rotor swing angle from the contiguity point of the circular surface of said rotor and the inner surface of said oval-shaped chamber side wall.

3. The apparatus according to claim 1 further comprising roller means on said rotor disposed adjacent said radially extending slots and engaged with said blades to support and facilitate extension and retraction thereof.

4. The apparatus according to claim 1 further comprising roller means at the outer ends of said blade guide elements rotatably engaged in said guide grooves in said chamber end walls.

5. The apparatus according to claim 1 further comprising seal means surrounding each said guide groove disposed between the inner surface of each said chamber end wall and the outer surface of said rotor end walls to form a sealing relation therebetween.

6. The apparatus according to claim 1 wherein said water channel and said water inlet and outlet are substantially the same width as the width of said chamber.

7. The apparatus according to claim 1 further comprising damper means operatively connected with said water inlet and selectively movable relative thereto to vary the area of said water inlet and the water entry angle in relation to the speed of the watercraft.

8. The apparatus according to claim 1 further comprising working fluid inlet and outlet means formed in said chamber side wall configured to receive a working fluid tangential to the axis of rotation of said rotor, said working fluid expanding upon entry into said chamber to impart a force on said blades to cause rotation of said rotor; and upon rotation of said rotor, said blades drawing water through said water inlet into said water channel generally tangential to the axis of rotation and as rotation continues said blades discharging said water from said water outlet in a jet stream and discharging said working fluid through said working fluid outlet means.

9. The apparatus according to claim 8 wherein said working fluid inlet and outlet means are substantially the same width as the width of said chamber.

* * * * *